United States Patent [19]

Gurmarnik

[11] Patent Number: 4,604,063
[45] Date of Patent: Aug. 5, 1986

[54] SYSTEM FOR AND A METHOD OF TRANSLATION

[76] Inventor: Simon Gurmarnik, 650 Mix Ave., Hamden, Conn. 06514

[21] Appl. No.: 666,097

[22] Filed: Oct. 29, 1984

[51] Int. Cl.⁴ .............................................. G09B 19/08
[52] U.S. Cl. ...................................... 434/157; 283/46; 434/326; 434/363; 434/262
[58] Field of Search ................ 434/157, 326, 363, 262; 283/46

[56] References Cited

U.S. PATENT DOCUMENTS 4,428,733  1/1984  Kumar-Misir .................. 434/157 X Primary Examiner—William H. Grieb
Attorney, Agent, or Firm—Ilya Zborovsky

[57] ABSTRACT

For translation between a plurality of languages at least two carriers for at least two languages are provided with at least one question and at least one answer at the same locations, and the carriers are aligned with one another so that the questions and the answers are also aligned with one another so as to allow easy identification of the questions and the answer in the respective language.

12 Claims, 2 Drawing Figures

FIG. 1

ENGLISH ○
1. ARE YOU ALLERGIC TO PENICILLIN ?  ☐ YES  ☐ NO

2. DO YOU SMOKE ?  ☐ YES  ☐ NO

3. DO YOU DRINK ?  ☐ YES  ☐ NO

SPANISH ○
1. ES USTED SENSIBLE (ALLERGICO) A LA PENICILLINA?  ☐ SI  ☐ NO

2. FUMA ?  ☐ SI  ☐ NO

3. BEBE ?  ☐ SI  ☐ NO

FRENCH ○
1. ETES-VOUS ALLERGIQUE A LA PENICILLINE ?  ☐ OUI  ☐ NO

2. FUMEZ-VOUS ?  ☐ OUI  ☐ NO

3. BUVEZ-VOUS BEAUCOP ?  ☐ OUI  ☐ NO

SYSTEM FOR AND A METHOD OF TRANSLATION

BACKGROUND OF THE INVENTION

The present invention relates to a system for and a method of translation between a plurality of languages. More particularly, it is suitable for exchange of professional/legal informaton with foreigners possessing the native language only.

Known methods of translation of exchange of information between foreigners possess considerable disadvantages. Practical use of existing conversational aids and dictionaries is restricted by extremely limited feedback facilities. Bi-lingual questionnaires with exact translations are adequate in short acknowledgements. Any attempt of widening the grounds and/or inserting additional language makes the text clumsy and difficult to read. It is therefore advisable to develop systems and methods which make easier and faster information exchange between foreigners which know only their native languags.

SUMMARY OF THE INVENTION

Accordingly, its an object of the present invention to provide a system for and a method of translation between a plurality of languages, which avoids the disadvantages of the prior art.

In keeping with these objects and with others which become apparent hereinafter, one feature of the present invention resides, briefly stated, in a system for translation between a plurality of languages, which has a plurality of carriers each corresponding to one language and including at least one question and at least one answer to said one question, said questions on each of said carriers being located on the same questions locations, and said answers to each of said questions being located on the same answers locations, so that when at least two carriers corresponding to two languages are brought in alignment with one another, similar questions are aligned in both carriers and similar answers are also aligned in both carriers.

When the system is designed and the method is performed in accordance with the present invention, it is not necessary to know any foreign language. The person who asks questions finds the respective carrier with the question and the answer in his language, then he finds the same carrier in a foreign language for a person who is supposed to answer his question, the asking person aligns both carriers and hands them to the person who is supposed to answer, the person who is supposed to answer looks in the carrier in his native language and marks the respective answer on it. Then the carriers are again aligned, and the first person who asks the questions can see the respective location of his carrier the answer given by the second person.

The novel features of the present invention are set forth in particular in the appended claims, the invention itself, however, will be best understood from the following description of the preferred embodiment, which is accompanied by the following drawing.

BRIEF DESCRIPTION OF THE DRAWING

FIG. 1 is a view showing 3 carriers of similar content for three languages in accordance with the preset invention.

DESCRIPTION OF PREFERRED EMBODIMENT

Figure 2:
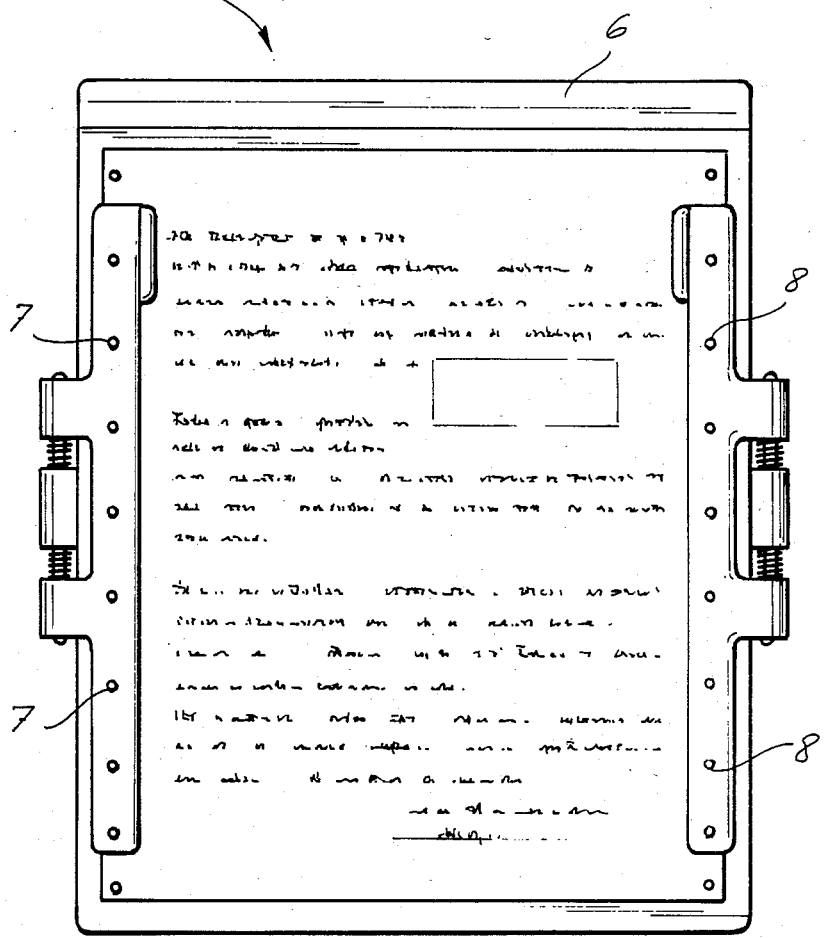
FIG. 2 is a view showing a holder for holding the carriers in alignment with one another.
Figure 2B:
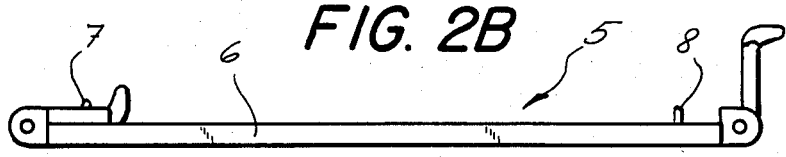

A system for translation between a plurality of languages in accordance with the present invention includes a plurality of carriers which for a respective one of the languags, identified with reference numerals 1, 2, 3. The carrier 1 is for the English language, the carrier 2 is for the Spanish language, the carrier 3 is for the French language.

Each carrier has at least one question in the respective language as identified with reference numerals 1', 2', 3'. These questions are arranged on all carriers at the same location, or in other words so that when the carriers are aligned or located one behind the other, all the questions are brought in alignment with one another.

In the vicinity of the questions, each carrier has one answer or similar answers. As shown in FIG. 1, each carrier has the answer "Yes" identified with reference numerals 1", 2", 3" and the answer "No" identified with reference numerals 1''', 2''', 3'''. The answers on each carrier are also arranged on the same location, so that when the carriers are brought in alignment or located one behind the other, the same answers are in alignment with each other.

The system operates and the method is performed in the following manner. An English speaking physician who has to ask the question of a Spanish speaking patient takes the carrier 1 and the carrier 2. If he wants to ask the patient whether he is alergic to penicillin, he puts the carrier 2 on the top of the carrier 1 and hands it to the Spanish speaking patient. The Spanish speaking patient reads the question 2' and selects the answer between the answers 2" and 2'''. He, for example, encircles the respective answer 2" or 2'''. Then he gives back both carriers to the English speaking physician. By comparing both carriers, the English speaking physician can easily identify on the carrier 1 the answer of the patient, which is either 1" or 1'''. Thus, the communication between two persons each knowing his own language is easy and fast.

As can be seen from FIG. 1, the answers on the carriers can be provided with boxes so as to enable the people involved in communication to mark the respective box corresponding to the answer. As can also be seen from FIG. 1, each carrier can include several questions which are arranged all so that on all carriers the similar questions are at the similar location. It is also possible to provide the questions on each carrier with the respective numbers 1, 2, 3 so as to make easier identification of the questions by the people involved in communication.

The carriers shown in FIG. 1 include each only three questons. It is to be understood that there can be carriers including much more questions, for example of a questionaire type with dozens of questions on the same carrier. The only requirement is that on all carriers corresponding to all languages the same questions and the same answers are providfied at the same locations.

In accordance with another feature of the present invention, the carriers are formed as a carbon-doubled carrier for example of a carbon-doubled paper. When two carriers formed on carbon-doubled paper are brought in alignment with one another, a person who asks questions encircles the respective question and the circle is reprinted on the carrier for a person who is supposed to answer. Then the person who is supposed to answer puts his carrier on the top and encircles or marks the answer, and this answer is reprinted on the first carrier of the person who asks the questions.

Still another feature of the present invention is that alignment means are provided on all carriers. This alignment means can be formed, for example, as holes identified with reference numeral 4. In order to align the carriers for the purposes described herein above, it is sufficient to place them on each other so that the holes on the carriers are brought in alignment with each other. It is evident that holders such as for example pins can be inserted into the holes 4 to follow the carriers in alignment for a certain time.

FIG. 2 shows a holder for aligning the carriers, identified with reference numeral 5. The holder has a supporting plate 6, a turnable pressing strip 7, and a plurality of pins 8. The carriers can be placed on the supporting plate 6 so as to engage on the pins 8, and held by the strips 7.

The invention is not limited to the details shown, since various modifications and structural changes are possible without departing in any from the spirit of the preset invention.

What is desired to be protected by Letters Patent is set forth in the appended claims 1. A system for translation between a plurality of languages, comprising a plurality of carriers each corresponding to one language and including a plurality of questions and a plurality of answer choices to said questions; and transfer means interposable between said carriers, said questions on each of said carriers being located at the same questions locations, and said answer choices on each of said carriers being located at the same answer choices locations, so that when at least two carriers corresponding to two languages are overlaid with one another, similar questions are overlaid in both carriers and similar answer choices are overlaid in both carriers, so that when one person gave an answer to a question on one of said two carriers and therefore in one of said two languages, said given answer is transferred by said transfer means to said underlying carrier, whereby another person identifies the answer and the question on the other of said two carriers in the other of said languages, since said answer choices and said questions are located at the same questions locations and answer choices locations on said other carrier.

2. A system as defined in claim 1, wherein each of said carriers has a plurality of questions and a plurality of answers to said plurality of questions.

3. A system as defined in claim 1, wherein each of said carriers has at least two alternative answers to the same question.

4. A system as defined in claim 1; and further comprising two limited spaces each associated with the respective one of said answers on each of said carriers, to be marked by a person who is supposed to answer the respective question.

5. A system as defined in claim 1; and further comprising means for aligning said carriers with one another in overlaid condition.

6. A system as defined in claim 5, wherein said aligning means includes at least one hole on each of said carriers, arranged so that when the holes on at least two carriers are in alignment with one another, the questions and the answers on these two carriers are also in alignment with one another.

7. A system as defined in claim 6; and further comprising at least one pin arranged to extend through the holes of at least two carriers so as to hold in alignment with one another.

8. A system as defined in claim 5, wherein said aligning means includes a holding device with a supporting plate for supporting said carriers and clamping means for holding said carriers on said supporting plate.

9. A system as defined in claim 8, wherein said supporting plate is porvided with a plurality of pins engaging said carriers.

10. A method of translation between a plurality of languages, comprising the steps of providing a plurality of carriers each corresponding to one language and including a plurality of questions and a plurality of answer choices to said questions, so that said questions are located at the same questions locations and said answer choices are located at the same answer choices locations on each of said carriers; overlaying at least one of said carriers corresponding to one language with at least another of said carriers corresponding to another language so that similar questions are overlayed in both carriers and similar answer choices are overlayed in both carriers with one another; interposing the transfer means between said one and other carriers; giving on said one carrier an answer to a question by one person so that said given answer is transferred by said transfer means to said underlying carrier; and identifying by another person the question and the answer on said other carrier.

11. A system as defined in claim 1, wherein said carriers each includes a carbon-doubled paper forming said transfer means, 12. A system for translation between a plurality of languages, comprising a plurality of carriers each corresponding to one language and including a plurality of questions and a plurality of answer choices to said questions, said questions on each of said carriers being located at the same questions locations, and said answer choices on each of said carriers being located at the same answer choices locations, so that when at least two carriers corresponding to two languages are overlaid with one another similar questions are overlaid in both carriers and similar answer choices are overlaid in both carriers, so that when one person gave an answer to a question on one of said two carriers and therefore in one of said two languages and said given answer is transferred to the other underlying underlying carrier, another person can identify the answer and the question on the other of said two carriers in the other of said languages, since said answer choices and said questions are located at the same answer choices locations and questions locations on said other carrier.

* * * * *